(12) United States Patent
Simon

(10) Patent No.: US 8,156,332 B2
(45) Date of Patent: Apr. 10, 2012

(54) PEER-TO-PEER SECURITY AUTHENTICATION PROTOCOL

(75) Inventor: Steven Neil Simon, San Jose, CA (US)

(73) Assignee: Apple Inc., Cupertino, CA (US)

( * ) Notice: Subject to any disclaimer, the term of this patent is extended or adjusted under 35 U.S.C. 154(b) by 891 days.

(21) Appl. No.: 11/807,838

(22) Filed: May 29, 2007

(65) Prior Publication Data

US 2008/0301435 A1 Dec. 4, 2008

(51) Int. Cl.
*H04L 9/32* (2006.01)
*G06F 7/04* (2006.01)

(52) U.S. Cl. .......................... 713/168; 726/3
(58) Field of Classification Search .............. 713/186; 726/3

See application file for complete search history.

(56) References Cited

U.S. PATENT DOCUMENTS

| 5,764,766 | A * | 6/1998 | Spratte ........................ 380/262 |
| 5,764,772 | A * | 6/1998 | Kaufman et al. ............... 380/30 |
| 6,052,469 | A * | 4/2000 | Johnson et al. ............... 380/286 |
| 6,064,736 | A * | 5/2000 | Davis et al. .................... 713/155 |
| 6,178,508 | B1 * | 1/2001 | Kaufman ....................... 713/183 |
| 6,367,010 | B1 * | 4/2002 | Venkatram et al. ............ 713/171 |
| 6,539,479 | B1 * | 3/2003 | Wu ................................ 713/151 |
| 6,959,394 | B1 * | 10/2005 | Brickell et al. ................. 726/5 |
| 2002/0141593 | A1 * | 10/2002 | Kurn et al. ..................... 380/286 |
| 2003/0093680 | A1 * | 5/2003 | Astley et al. ................... 713/183 |
| 2003/0126436 | A1 * | 7/2003 | Greenberg et al. ........... 713/168 |
| 2004/0034773 | A1 * | 2/2004 | Balabine et al. .............. 713/168 |
| 2005/0005173 | A1 * | 1/2005 | Moffat et al. ................. 713/202 |
| 2005/0166263 | A1 * | 7/2005 | Nanopoulos et al. ......... 726/7 |
| 2006/0039404 | A1 * | 2/2006 | Rao et al. ...................... 370/465 |
| 2006/0059179 | A1 * | 3/2006 | Asano .......................... 707/100 |
| 2006/0085643 | A1 * | 4/2006 | Philips .......................... 713/171 |
| 2007/0039042 | A1 * | 2/2007 | Apelbaum ...................... 726/6 |
| 2007/0101133 | A1 * | 5/2007 | Liu et al. ....................... 713/168 |
| 2007/0130343 | A1 * | 6/2007 | Pardo-Blazquez et al. ... 709/227 |
| 2007/0180230 | A1 * | 8/2007 | Cortez .......................... 713/156 |
| 2007/0192601 | A1 * | 8/2007 | Spain et al. ................... 713/168 |
| 2007/0226502 | A1 * | 9/2007 | Tenny ........................... 713/170 |
| 2009/0323932 | A1 * | 12/2009 | Youn ............................. 380/30 |

OTHER PUBLICATIONS

Apple, Developer Connection, AFP Login, http://developer.apple.com/documentation/Networking/Conceptual/AFP/Concepts/chapter_2_section_5.html, Apr. 4, 2006.
Myers et al, RFC 1939, Post Office Protocol—Version 3, May 1996, http://www.faqs.org/rfcs/rfc1939.html.
Klensin et al., RFC 2195, IMAP/POP Authorize Extension for Simple Challenge/Response, Sep. 1997, http://www.faqs.org/rfcs/rfc2195.html.
Kurt D. Zeilenga, SASL Yet Another Password Mechanism, Feb. 25, 2007.

* cited by examiner

*Primary Examiner* — Techane Gergiso
(74) *Attorney, Agent, or Firm* — Van Pelt, Yi & James LLP

(57) ABSTRACT

A salt transmitted by a second node is received at a first node. The received salt is used to decrypt encrypted data. Optionally, authorization to access a service provided by the second node is received by the first node. In some cases the service includes access to one or more files.

26 Claims, 5 Drawing Sheets userID = demouser password = "password"

salt = 2B D8 2D C1 salted hash = 2B D8 2D C1 06 DA B7 05 94 0B B1 37 2A 38 E2 22 5E B5 63 12 9B E1 2A 34

FIG. 2

PEER-TO-PEER SECURITY AUTHENTICATION PROTOCOL

BACKGROUND OF THE INVENTION

One way users can authenticate themselves to servers over a network (and thereby gain access to services) is through the use of a challenge-response protocol. When a client attempts to connect to a server, the server sends a challenge string to the client. The client answers with a username and a response to the challenge that uses the user's password as a cryptographic key and the server's challenge as the message. The server maintains a listing of users and their passwords. The server uses its stored information in an attempt to duplicate the response provided by the client. If the client's response and the server-generated recreation match, the authentication is successful.

Approaches such as having the server store a hash of the user's password, rather than the password itself, are used to help protect the authentication scheme against eavesdroppers. Unfortunately, while hashes obfuscate a user's password, attacks such as dictionary attacks and brute-force attacks, and the use of rainbow tables can nonetheless allow nefarious individuals to circumvent traditional challenge-response schemes. Another technique used to help protect the authentication scheme is to harden the server, such as by disallowing read access to certain files, limiting access to services, and locating servers in physically secure locations. Unfortunately, taking such precautions may not be possible (e.g., in the case of physically securing the server) or may lead to a tradeoff between security (limiting access to services) and usability (providing access to services).

Therefore, it would be desirable to have a better authentication protocol.

BRIEF DESCRIPTION OF THE DRAWINGS

Various embodiments of the invention are disclosed in the following detailed description and the accompanying drawings.

FIG. 2 illustrates an embodiment of information that is used in an authentication.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
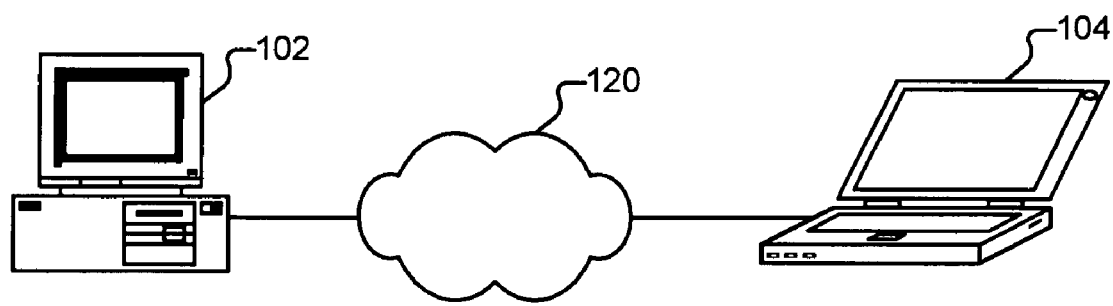
FIG. 1 is a block diagram of an environment providing authentication.

FIG. 1 is a block diagram of an environment providing authentication. In the example shown, two nodes are included, a client 102 and a server 104. As used herein, a client is a device that seeks to obtain access to one or more services (and/or other resources, referred to herein collectively as "services") provided by a server. As described in more detail below, server 104 maintains information about users authorized to access assorted services that it can provide. Examples of services/resources include file sharing, permitting the sending/receiving of mail, media streaming, access to devices managed by the server such as printers/scanners, wireless network access, etc.

In some embodiments nodes serve as both clients and servers simultaneously. Client 102 as shown in FIG. 1A is a desktop computer that a user would like to use to access files (e.g., music files and photographs) that are stored on server 104, a laptop. In another scenario, a user of laptop 104 might seek to access a service provided by desktop computer 102. In that situation, the roles of client 102 and server 104 would be reversed and the techniques described herein adapted accordingly.

Client 102 and server 104 are connected via a network 120. The network may be a public or private network and/or combination thereof to support digitally switched protocols and may include the Internet, an intranet, LAN, WAN, or other forms of connecting multiple systems and/or groups of systems together. Other examples of clients (and servers, as applicable) include cellular phones and personal digital assistants, as well as other types of information appliances such as set-top boxes, game consoles, and digital video recorders.

FIG. 2 illustrates an embodiment of information that is used in an authentication. In the example shown, server 104 stores, for each authorized user, a userID 202 and a salted hash 208. The salted hash is generated from the user's password 204 and salt 206. In the example shown, salt 206 makes up the first four bytes of salted hash 208 and a SHA-1 hash of password 204 makes up the remaining 20 bytes of salted hash 208. In various embodiments, other hashing methods or obfuscation techniques are used, such as SHA-256, as appropriate. In a traditional authentication system, a server stores, for each user, a userID and a password, or a userID and a hash (such as an MD5 hash) of the password in a password file or database. The addition of salt data makes it more difficult (e.g., requiring more storage, processing power, and/or time) to perform attacks against the stored password file/database.

Portions of the information shown in FIG. 2 are used by server 104 to control access to assorted services. For example, a local user of server 104 may be prompted to enter a password by a login screen (e.g., upon boot, resumption from suspend, after a screen saver has engaged, etc.), and a transformation of that provided password is compared against the salted hash 208 stored on server 104 before the local user is allowed to further interact with server 104. Salted hash 208 may also be used to protect information stored on server 104, such as an encrypted file store. As described in more detail below, a third node, such as a user directory, may also store portions of the information shown in FIG. 2, such as the usernames and salted hashes of company employees, groups of enterprise users, etc.

Figure 3:
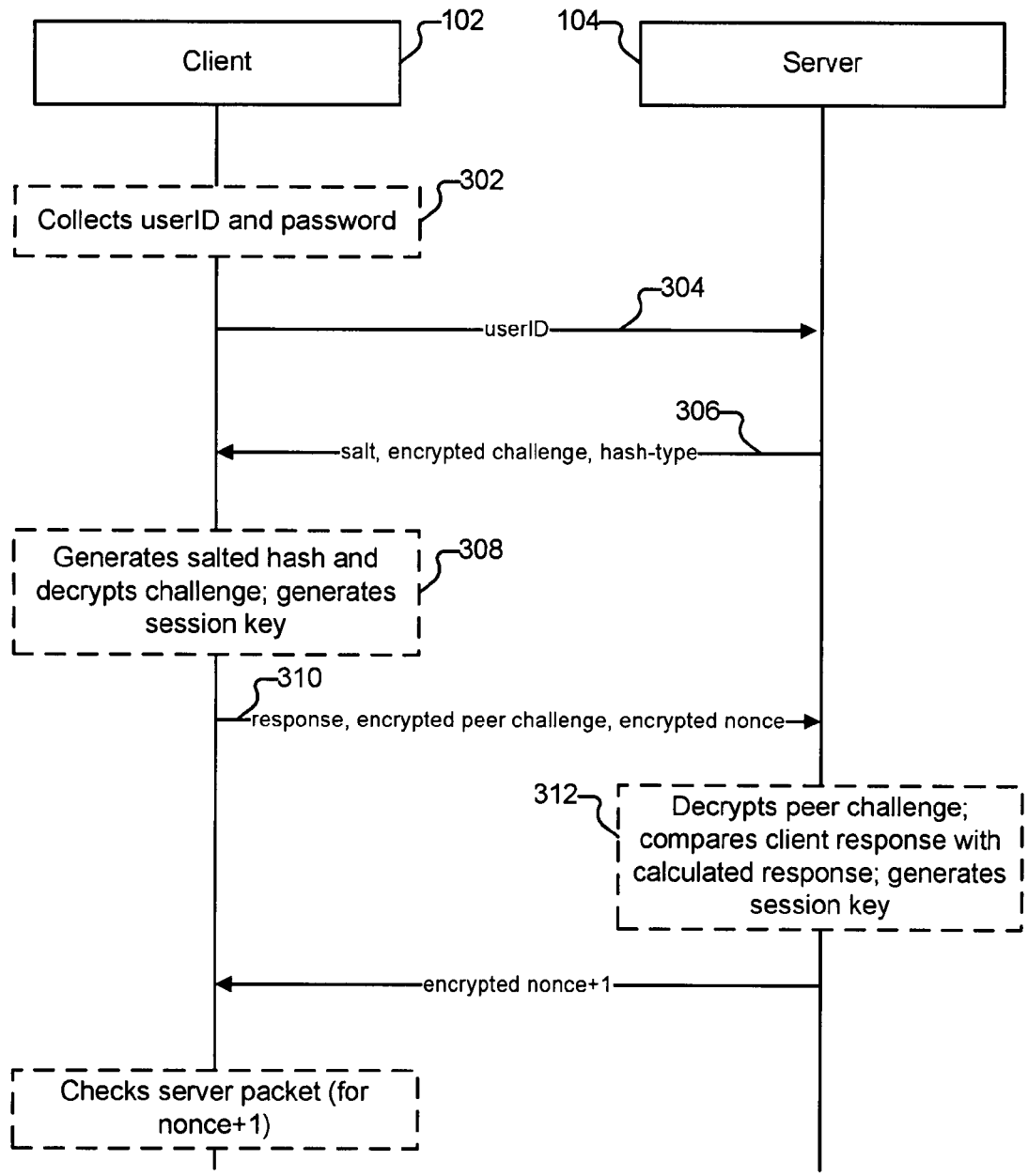
FIG. 3 is a diagram illustrating an embodiment of a process for authenticating a client to a server.

FIG. 3 is a diagram illustrating an embodiment of a process for authenticating a client to a server. In the example shown, a user of a client, such as desktop computer 102, wishes to access a directory of files that are stored on a server, such as server 104. Access to the files in that directory is restricted to authorized users. For example, an access control list stored on server 104 includes a list of userIDs permitted to access the contents of the directory. Any entity (e.g., client 102) that can successfully authenticate as one of the listed users is granted access to the directory accordingly.

The process begins at 302 when client 102 collects a userID and password, such as from a user entering that information into a graphical user interface, retrieving a cached copy of that information, etc. For example, suppose a user indicates that he or she would like to access files on a server by clicking on a folder icon. Client 102 contacts server 104 to determine what authentication protocols it supports. If the server advertises that it supports a protocol making use of the techniques described herein (e.g., as a SASL plugin, a SAMBA plugin, etc.), at 302, client 102 collects the userID and password applicable for use on the server. In some cases the userID and password of a user may be the same on both client 102 and server 104. If so, client 102 may be configured to automatically obtain the user's userID and password at 302 in a manner transparent to the user. In some embodiments, instead of collecting a password at 302, the password is collected at a later time, such as at 308.

At 304, client 102 transmits the userID obtained at 302 to server 104. Server 104 uses the provided userID to obtain (e.g., from a password file or store) the user's salted hash. Server 104 generates a challenge (e.g., a random value) and encrypts it using the user's salted hash. A variety of techniques can be used to encrypt the user's salted hash. In some embodiments, AES is used.

At 306, server 104 sends client 102 the user's salt (corresponding with the supplied userID), the encrypted challenge, and a hash-type value that indicates the nature of the hash on disk. In some embodiments the hash-type value is a string that includes the salt length and the hash type. One example hash-type value is "32+SHA1", indicating that 32 bits of salt and a SHA1 hash are used. If server 104 only has a UNIX crypt hash, the hash-type value might be "12+CRYPT", indicating twelve useful bits of salt and a crypt hash. As new hash techniques are developed, the implementation of the protocol can be updated accordingly (and the updates can be reflected through the use of new hash-type values). In various embodiments, the hash type is or at a user and/or administrator's option may be omitted, e.g. the hash type is known by the client and server in advance and/or is inferred from other information.

At 308, client 102 uses the salt provided by server 104 to generate the salted hash itself. Client 102 uses the salted hash to decrypt the challenge, and selects a challenge of its own (a "peer challenge"). Client 102 generates a session key (e.g., using the decrypted challenge received from server 104, the peer challenge it has selected, and the salted hash as inputs to a hash function such as MD5).

At 310, the client sends server 104 a response to the challenge (e.g., using SHA-1), the peer challenge encrypted with the salted hash (e.g., using AES), and a nonce that will be used to verify the session key. In some embodiments the nonce is a four-byte word in network byte order.

At 312, the server verifies the response. In some embodiments, if the response is incorrect, the mechanism aborts without further conversation. If the response is correct, the server generates the session key for itself and the nonce sent by client 102 is decrypted using the session key. Server 104 adds one to the value and returns the new value encrypted with the session key. At 314, client 102 decrypts the server's incremented nonce and verifies it. If the value is correct, a session is successfully established.

Figure 4A:
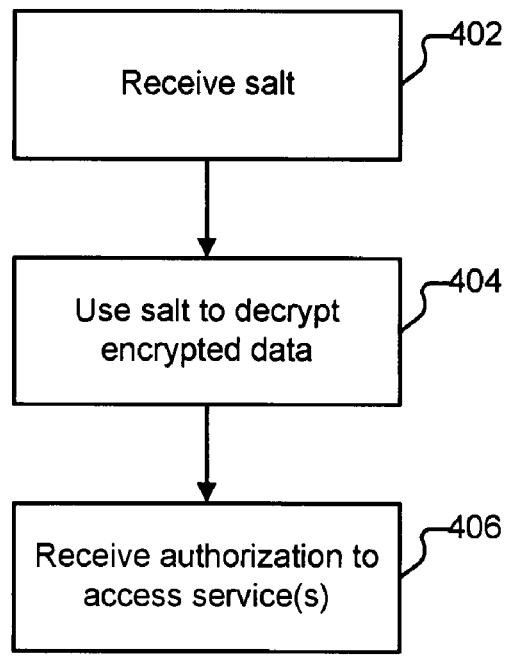
FIG. 4A is a flowchart illustrating an embodiment of a process for authenticating a client to a server.

FIG. 4A is a flowchart illustrating an embodiment of a process for authenticating a client to a server. In some embodiments the process shown in FIG. 4A is performed by client 102. The process begins at 402 when a salt is received. For example, at 402, a salt is received by client 102 from server 104. As described in more detail below, in some embodiments, server 104 obtains the salt from a third node.

At 404, the received salt is used to decrypt encrypted data. For example, at 404, client 102 uses the salt received at 402, along with a password, to form a salted hash. The salted hash can then be used at 404 to decrypt data encrypted to the salted hash. In some embodiments the encrypted data is also received from server 102.

At 406, authorization to access one or more services is received. For example, after successfully decrypting data at 404, in some embodiments client 102 provides proof to server 104 that it is capable of successfully accomplishing the decryption performed at 404. Once server 104 receives the proof, server 104 provides to client 102 access to the appropriate services.

Figure 4B:
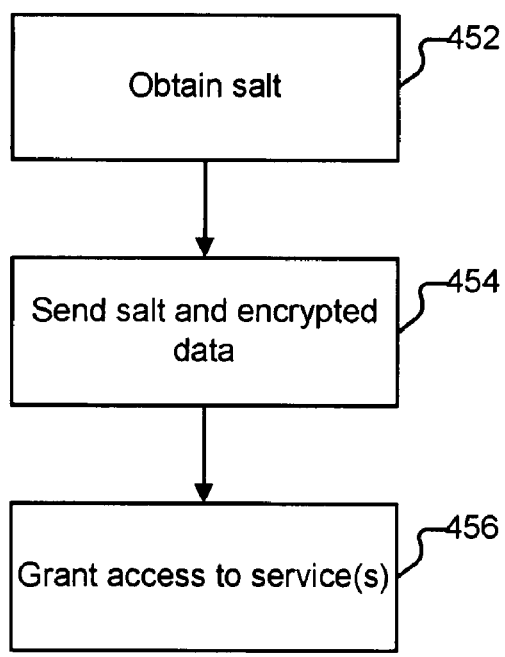
FIG. 4B is flowchart illustrating an embodiment of a process for authenticating a client to a server.

FIG. 4B is flowchart illustrating an embodiment of a process for authenticating a client to a server. In some embodiments the process shown in FIG. 4B is performed by server 104. The process begins at 452 when a salt is obtained. For example, at 452, a server such as server 104 retrieves a salt from a salted hash stored on server 104. As described in more detail below, in some embodiments, server 104 obtains the salt from a third node.

At 454, the obtained salt is sent to a client such as client 102, along with encrypted data. In some embodiments the encrypted data is received from a third node, as described in more detail below. At 456, server 104 grants to client 102 access to one or more services, as appropriate. For example, if client 102 can demonstrate to server 104 that client 102 is capable of decrypting the encrypted data sent by server 104 at 454, at 456, client 104 grants the applicable access to a directory of files.

Figure 5:
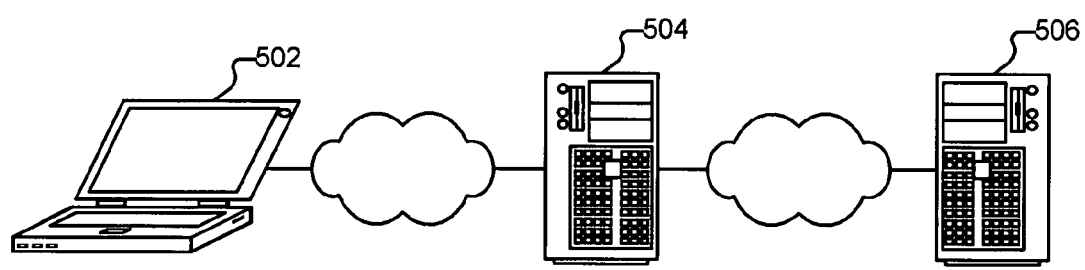
FIG. 5 is a block diagram of an environment providing authentication.

FIG. 5 is a block diagram of an environment providing authentication. A client 502, a server 504, and a third node (506) are included. In the example shown, node 506 is a user directory that includes userIDs and other information such as salted hashes that correspond to those userIDs. Server 504 is a fileserver. In various embodiments, client 502, server 504, and node 506, or subsets thereof, are members of the same network, such as a corporate enterprise network.

Server 504 and node 506 authenticate to one another, such as by using digital certificates. When client 502 attempts to access files stored on fileserver 504, fileserver 504 forwards the userID provided by client 502 (e.g., at 304 of FIG. 3) to node 506. If node 506 has a salted hash corresponding to the provided userID, node 506 generates an encrypted challenge and forwards the information shown at 306 in FIG. 3 to fileserver 504 which in turn sends it to client 502. If node 506 does not have information pertaining to the userID, additional user directories can be consulted (if present) until the userID and corresponding information is located, or the process can terminate if the information is not available.

The process shown in FIG. 3 continues, with fileserver 504 passing the information provided by client 502 through to node 506 which performs the functions of server 104 and passes information back to fileserver 504 for forwarding to client 502. In various embodiments, the process is performed in a manner transparent to client 502, such that client 502 is unable to determine that fileserver 504 is communicating with and receiving information from node 506. If the procedure is successful, client 502 and fileserver 504 will ultimately share a session key.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of computer security, comprising:
   receiving at a first node a salt transmitted from a second node, wherein the salt is associated with a user at the first node;
   receiving at the first node encrypted data transmitted from the second node, wherein the encrypted data is encrypted based at least in part on a salted hash comprising a combination of the salt and a hash of additional data; and
   decrypting at the first node the received encrypted data, wherein decrypting includes generating the salted hash based at least in part on the salt.

2. The method of claim 1 further comprising receiving authorization to access a service provided by the second node.

3. The method of claim 2 wherein the service includes access to one or more files.

4. The method of claim 1 further comprising sending the user identifier from the first node.

5. The method of claim 1 further comprising using additional data to decrypt the encrypted data.

6. The method of claim 5 wherein the additional data comprises a password of the user at the first node.

7. The method of claim 1 wherein the encrypted data is used to compute a session key.

8. The method of claim 1 wherein the encrypted data is received from the second node and is used to compute a session key.

9. The method of claim 1 wherein the salted hash is obtained directly or indirectly from a third node.

10. The method of claim 9 wherein the third node is a user directory.

11. The method of claim 1 wherein the encrypted data is received directly or indirectly from a third node.

12. The method of claim 11 wherein the third node is a user directory.

13. The method of claim 1 further comprising generating a peer challenge.

14. The method of claim 1 further comprising establishing a session with the second node.

15. A method of computer security, comprising:
    obtaining at a first node a salted hash, wherein the salted hash comprises a combination of a salt associated with a user identifier of a user at a second node and a hash of additional data; and
    sending the salt and encrypted data to the second node, wherein the encrypted data is encrypted based at least in part on the salted hash, wherein the second node is configured to use the received salt to decrypt the received encrypted data, including by generating the salted hash based at least in part on the salt.

16. The method of claim 15 further comprising granting authorization to access a service provided by the first node.

17. The method of claim 15 further comprising receiving the user identifier at the first node.

18. The method of claim 15 further comprising receiving a peer challenge.

19. The method of claim 18 further comprising generating a response to the peer challenge.

20. The method of claim 15 further comprising obtaining the salt from a third node.

21. The method of claim 15 further comprising receiving the encrypted data from a third node.

22. The method of claim 15 further comprising establishing a session with the second node.

23. A system for computer security, including:
    a processing device; and
    a memory coupled with the processing device, wherein the memory is configured to provide the processing device with instructions which when executed cause the processor to:
    receive at a first node a salt transmitted from a second node, wherein the salt is associated with a user at the first node;
    receive at the first node encrypted data transmitted from the second node, wherein the encrypted data is encrypted based at least in part on a salted hash comprising a combination of the salt and a hash of additional data; and
    decrypting at the first node the received encrypted data, wherein decrypting includes generating the salted hash based at least in part on the salt.

24. A system for computer security, including:
    a processing device; and
    a memory coupled with the processing device, wherein the memory is configured to provide the processing device with instructions which when executed cause the processor to:
    obtain at a first node a salted hash, wherein the salted hash comprises a combination of a salt associated with a user identifier of a user at a second node and a hash of additional data; and
    send the salt and encrypted data to the second node, wherein the encrypted data is encrypted based at least in part on the salted hash, wherein the second node is configured to use the received salt to decrypt the received encrypted data, including by generating the salted hash based at least in part on the salt.

25. A non-transitory computer program product for computer security, the computer program product being embodied in a computer readable medium and comprising computer instructions for:
    receiving at a first node a salt transmitted from a second node, wherein the salt is associated with a user at the first node;
    receiving at the first node encrypted data transmitted from the second node, wherein the encrypted data is encrypted based at least in part on a salted hash comprising a combination of the salt and a hash of additional data; and
    decrypting at the first node the received encrypted data, wherein decrypting includes generating the salted hash based at least in part on the salt.

26. A non-transitory computer program product for authenticating a client to a server, the computer program product being embodied in a computer readable medium and comprising computer instructions for:

obtaining at a first node a salted hash, wherein the salted hash comprises a combination of a salt associated with a user identifier of a user at a second node and a hash of additional data; and sending the salt and encrypted data to the second node, wherein the encrypted data is encrypted based at least in part on the salted hash, wherein the second node is configured to use the received salt to decrypt the received encrypted data, including by generating the salted hash based at least in part on the salt.

* * * * *